United States Patent [19]

Parthasarathy et al.

[11] Patent Number: 5,913,192
[45] Date of Patent: Jun. 15, 1999

[54] SPEAKER IDENTIFICATION WITH USER-SELECTED PASSWORD PHRASES

[75] Inventors: Sarangarajan Parthasarathy, New Providence; Aaron Edward Rosenberg, Berkely Heights, both of N.J.

[73] Assignee: AT&T Corp, Middletown, N.J.

[21] Appl. No.: 08/916,662

[22] Filed: Aug. 22, 1997

[51] Int. Cl.[6] ............................. G10L 5/06; G10L 9/00
[52] U.S. Cl. ........................... 704/256; 704/250; 704/244
[58] Field of Search .................................. 704/256, 250, 704/244

[56] References Cited

U.S. PATENT DOCUMENTS

| | | | |
|---|---|---|---|
| 5,377,301 | 12/1994 | Rosenberg et al. | 395/2.31 |
| 5,517,558 | 5/1996 | Parthasarathy | 704/256 |
| 5,526,465 | 6/1996 | Carey | 704/250 |
| 5,555,344 | 9/1996 | Zunkler | 395/2.51 |
| 5,579,436 | 11/1996 | Chou | 704/244 |

OTHER PUBLICATIONS

"Cepstral Channel Normalization Techniques for HMM-Based Speaker Verification" by Rosenberg, Lee and Soong, *Proc. 1994 International Conf. on Spoken Language Processing*, pp. 1835–1838, Yokohama, Japan (1994) (four pages).

"The Segmental K–Means Algorithm for Estimating Parameters of Hidden Markov Models" by Juang and Rabiner, reprinted from *IEEE transactions on Acoustics, Speech, and Signal Processing*, v. 38, No. 9, pp. 1639–1641 (Sep. 1990) (four pages).

"Evaluation of a Vector Quantization Talker Recognition System in Text Independent and Text Dependent Modes" by Rosenberg and Soong, *Computer Speech and Language*, vol. 2, pp. 143–157 (1987) (fifteen pages).

"A User–Configurable System For Voice Label Recognition" by Rose, Lleida, Erhart and Grubbe, *Proc. 1996 International Conference on Spoken Language Processing*, v. 2, pp. 582–585, Sep., 1996 (four pages).

*Primary Examiner*—David R. Hudspeth
*Assistant Examiner*—Robert Louis Sax

[57] ABSTRACT

A speaker identification system includes a speaker-independent phrase recognizer. The speaker-independent phrase recognizer scores a password utterance against all the sets of phonetic transcriptions in a lexicon database to determine the N best speaker-independent scores, determines the N best sets of phonetic transcriptions based on the N best speaker-independent scores, and determines the N best possible identities. A speaker-dependent phrase recognizer retrieves the hidden Markov model corresponding to each of the N best possible identities, and scores the password utterance against each of the N hidden Markov models to generate a speaker-dependent score for each of the N best possible identities. A score processor coupled to the outputs of the speaker-independent phrase recognizer and the speaker-dependent phrase recognizer determines a putative identity. A verifier coupled to the score processor authenticates the determined putative identity.

14 Claims, 2 Drawing Sheets

SPEAKER IDENTIFICATION WITH USER-SELECTED PASSWORD PHRASES

TECHNICAL FIELD

The invention relates generally to speaker identification systems, and more particularly to a speaker identification system which uses a password utterance to identify a speaker and verify the accuracy of such identification.

BACKGROUND OF THE INVENTION

Considerable attention has been given in recent years to text-dependent, fixed-password speaker verification systems for network-based applications. An example of such a system is one in which customers are assigned unique digit string password utterances which are used for both identity claim and verification.

In such previous system the digit string password utterance is decoded by a speaker-independent, connected-digit recognizer to find a matching, valid, customer account number. The utterance is then compared with models for the customer and a matching score is generated. This score is compared with a rejection threshold to decide whether or not to authenticate the claim. The combined system, digit recognizer and speaker verifier, can be considered an (open-set) speaker identification system.

In speaker identification a speech sample from an unknown speaker is processed and associated with the customer with the best matching models. "Open-set" refers to the possibility that the speech sample may be provided by a speaker outside the customer set (e.g., an imposter). Thus, the quality of the best match must be assessed to determine whether or not the match is valid. This constitutes verification or authentication.

Speaker identification is, in general, more difficult than speaker verification. Whereas in speaker verification the speech is compared with just one customer model, in speaker identification, in general, the sample must be compared with every customer's model, so that processing and error rate increase as the size of the customer population increases.

What makes a digit password system practical is that each customer is assigned a unique account number for a password, so that the digit recognizer is able to propose an identity claim reasonably accurately and efficiently. After it has been determined that the decoded digit string is a valid account number, the speech input is compared only with the models associated with that account.

Customers may find it more convenient and comfortable to use familiar phrases in place of digit strings for passwords one of the problems in moving from digit string passwords to general text passwords is that while digit string passwords can be represented as concatenations of whole-word digit units, general text passwords, drawn from an arbitrary size vocabulary, must be represented as concatenations of smaller units such as phones. Since phone units are smaller and more prone to segmentation and recognition errors than digit units, and are more numerous and more confusable, it is not unreasonable to expect that some degradation in performance will occur. Since decoding a password phrase into a string of phones is substantially more prone to error than decoding a digit string password into a string of digits, a lexicon containing phone transcriptions of user password phrases can be used to constrain the recognition and control such errors.

SUMMARY OF THE INVENTION

A speaker identification system in accordance with the principles of the invention identifies a speaker who has spoken a password utterance by determining a putative identity from an enrolled user group based on the password utterance and verifying the determined putative identity using the same password utterance. An illustrative embodiment of the speaker identification system includes a lexicon database memory storing for each of a group of enrolled users a set of one or more phonetic transcriptions of a password utterance associated with the enrolled user, and an HMM database memory storing for each of the group of enrolled users a hidden Markov model corresponding to such password utterance. An acoustic transducer receives a spoken password utterance and produces a speech signal. A feature extractor receives the speech signal and extracts features therefrom. A speaker-independent phrase recognizer coupled to the feature extractor scores the password utterance against all the sets of phonetic transcriptions in the lexicon database memory to determine the N best matching password phrases and generate a speaker-independent score for each of the N best matching password phrases. A speaker-dependent phrase recognizer coupled to the feature extractor retrieves the hidden Markov model corresponding to each of the N best matching password phrases, and scores the password utterance against each of the N respective hidden Markov models to generate a speaker-dependent score for each of the N best matching password phrases. A score processor coupled to the speaker-independent phrase recognizer and the speaker-dependent phrase recognizer sums, for each of the N best matching password phrases, the speaker-independent score and the speaker-dependent score to generate a combined score, and determines a putative identity based on the highest of the N combined scores. A verifier coupled to the score processor determines, for the putative identity, a verification score reflecting the difference between the speaker-dependent score and the speaker-independent score, compares the verification score to a verification threshold, and authenticates or rejects the identification based on the comparison.

Other advantages and salient features of the invention will become apparent from the following detailed description, which taken in conjunction with the annexed drawing, discloses preferred embodiments of the invention.

DETAILED DESCRIPTION

Figure 1:
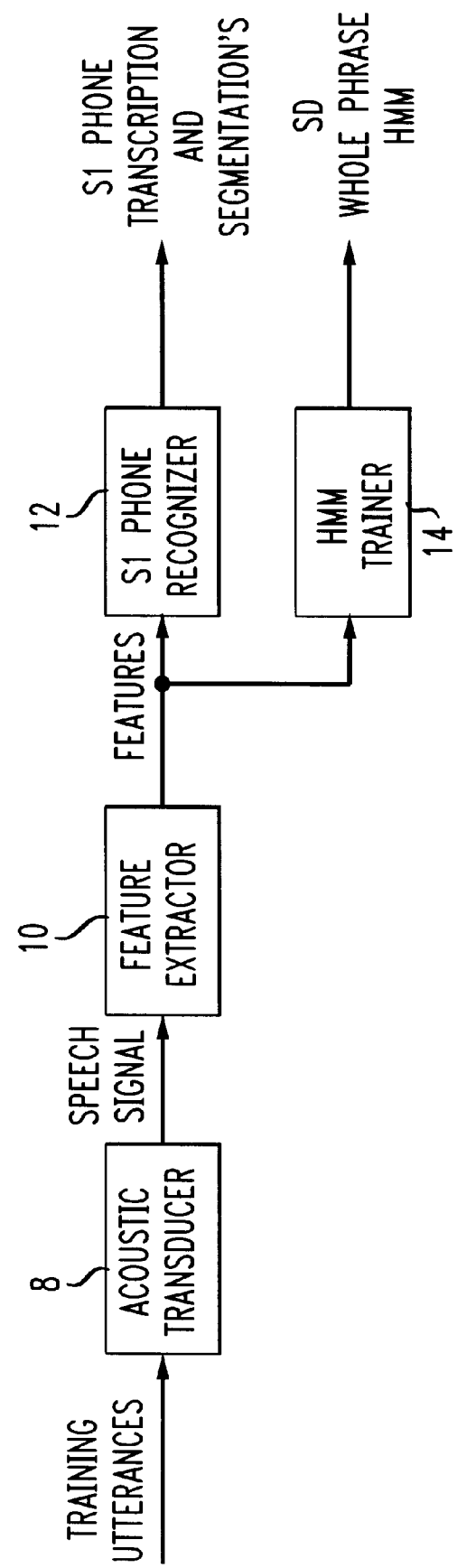
FIG. 1 illustrates a training process according to the principles of the invention.

For a better understanding of the invention, together with other and further objects, advantages, and capabilities thereof, reference is made to the following disclosure and the figures of the drawing. For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

A speaker identification system in accordance with the principles of the invention uses general text passwords for speaker identification and verification. The speaker identification system identifies a speaker from an enrolled user group based on a spoken password phrase and verifies the identification of the speaker using the same spoken password phrase.

During training of the speaker identification system, customers select arbitrary, sentence-long password phrases whose texts are unknown to the system. Each user enrolls in the system by providing tokens of his selected password phrase in a single recording session. Training results in two kinds of reference models for each user: first, automatically derived phone transcriptions of the user-selected password phrase, stored in a lexicon database memory with similarly derived transcriptions for other users' password phrases, and second, a whole-phrase speaker-dependent hidden Markov model (HMM) of the user-selected password phrase stored in an HMM database memory.

During testing, an unknown speaker records a password phrase utterance. Identification of the unknown speaker during testing includes two phases. In the first phase, the input password phrase is processed and scored against the lexicon of user password phrases using the speaker-independent phone models to obtain a small set (e.g., five) of the best matching user password phrases which represent possible identities. In the second phase, the input password phrase is scored against speaker-dependent HMM's which correspond to these (e.g., five) best matching password phrases. A score processor determines a combined score from the results of the two phases for each of the small set of possible identities, and determines a putative identity based on the highest combined score. A verifier determines a verification score for the putative identity and compares the verification score with a decision threshold to determine whether to accept or reject the identification.

An enrollment training process is illustrated schematically in FIG. 1. Referring to FIG. 1, the enrollment training process uses an acoustic transducer 8, such as a microphone in the handset of a telephone, a feature extractor 10 coupled to the output of the acoustic transducer 8, a speaker-independent (SI) phone recognizer 12 coupled to the output of the feature extractor 10, and a hidden Markov model (HMM) trainer 14 coupled to the output of the feature extractor 10. During enrollment of a user group, a user supplies a few samples of his sentence-long password utterance to the acoustic transducer 8. The feature extractor 10 outputs a sequence of cepstral plus delta cepstral feature vectors characterizing the password utterance. The speaker-independent phone recognizer 12 receives the sequence of cepstral plus delta cepstral features from the feature extractor 10 for each sample of the password utterance spoken by the user, and outputs a speaker-independent free-phone phonetic transcription which includes a segmentation of the utterance into speech and non-speech segments for each of the one or more (e.g., three) times the sentence-long password utterance is spoken by the user. The speaker-independent phone recognizer 12 interprets the password phrase as a sequence or concatenation of phones, and makes a free-phone transcription of the password utterance. A "phone" can be one or more of a set of general sound symbols for any speaker.

The one or more (e.g., three) phonetic transcriptions of the spoken password phrase are entered into a lexicon database memory 16 (FIG. 2) for each enrolled user. Using more than one phonetic transcription of the password utterance in accordance with the preferred embodiment of the invention takes into account alternate pronunciations by the particular user.

According to the preferred embodiment of the invention, the speaker-independent phone recognizer 12 makes three free-phone transcriptions of the sentence-long password utterance for each enrolled user. For a thousand users, there are thus three thousand phonetic transcriptions handled by the speaker-independent phone recognizer 12 and stored in the lexicon database memory 16 (FIG. 2).

From the sequence of feature vectors obtained from the training password utterances for each enrolled user, the HMM trainer 14 makes a speaker-dependent whole-phrase hidden Markov model (HMM) for the password utterance. The speaker-dependent whole-phrase HMM made from the sequence of feature vectors is an acoustic representation of the password phrase spoken by the particular user rather than a phonetic representation of the password phrase. The speaker-dependent whole-phrase HMM of the password phrase is constructed using the training utterances spoken by each enrolled user one or more (e.g., three) times, and stored in the HMM database memory 18 (FIG. 2).

Thus, for each enrolled user, there are three phonetic transcriptions of the same password phrase and one hidden Markov model for that same password phrase stored in the lexicon and HMM database memories, respectively.

Figure 2:
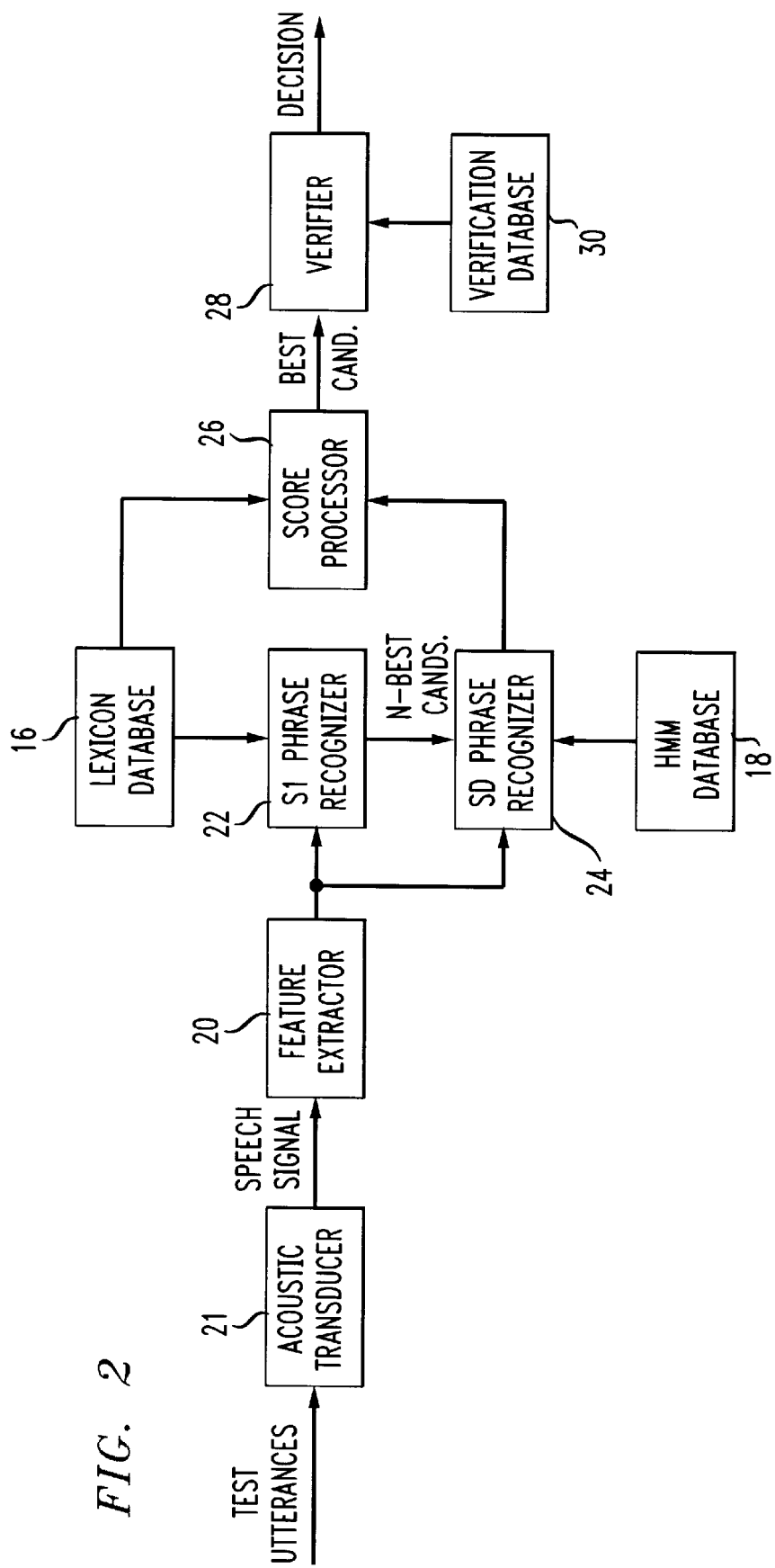
FIG. 2 illustrates a speaker identification process according to the principles of the invention.

The speaker identification operation is illustrated schematically in FIG. 2. Referring to FIG. 2, the identification process employs a feature extractor 20 coupled to an acoustic transducer 21. A speaker-independent (SI) phrase recognizer 22 is coupled to the feature extractor 20. The lexicon database memory 16 containing the phone transcriptions is coupled to the speaker-independent phrase recognizer 22. A speaker-dependent (SD) phrase recognizer 24 is coupled to the feature extractor 20. The speaker-dependent phrase recognizer 24 is coupled to receive the N (e.g., five) best candidates output from the speaker-independent phrase recognizer 22. The hidden Markov model (HMM) database memory 18 containing the speaker-dependent whole-phrase HMMs is coupled to the speaker-dependent phrase recognizer 24. A score processor 26 is coupled to the speaker-independent phrase recognizer 22 and the speaker-dependent phrase recognizer 24. The score processor 26 produces a score based on the outputs of the speaker-independent phrase recognizer 22 and speaker-dependent phrase recognizer 24. A verifier 28 is coupled to receive scores from the score processor 26. A verification database memory 30 is associated with the verifier 28.

In operation, an unknown user seeks to gain access to something for which his identity ought to be verified. The unknown user speaks an unknown sentence-long password utterance into the acoustic transducer 21. The feature extractor 20 outputs a sequence of cepstral plus delta cepstral feature vectors characterizing the unknown password utterance that was input by the unknown user.

The speaker-independent phrase recognizer 22 recognizes the password phrase by matching the utterance against all the phonetic transcriptions in the lexicon database memory 16, and generates a score for the password phrase of each enrolled user represented by phonetic transcriptions in the lexicon database memory 16. In the preferred embodiment, the generated scores are obtained as estimates of log likelihoods.

The lexicon database memory 16 provides a grammar which constrains the choices available to the speaker-independent phrase recognizer 22. The speaker-independent phrase recognizer 22 selects the N best sets of phonetic transcriptions, each set corresponding to the password phrase selected by a speaker, from the sets of phonetic transcriptions in the pre-existing lexicon provided by the lexicon database memory 16.

The speaker-independent phrase recognizer 22 chooses the N (e.g., N=5) highest scoring password phrases from the lexicon database memory. Each such score is obtained as the highest matching score over the alternate phonetic transcriptions for that password phrase stored in the lexicon database memory 16 for each enrolled user according to the preferred embodiment of the invention. The speaker-independent phrase recognizer 22 produces the N best speaker-independent scores and identifies the N best groups of alternate phonetic transcriptions, each group corresponding to one of the scores. From the best N (e.g., N=5) matching groups of alternate phonetic transcriptions chosen from the lexicon database memory 16, the speaker-independent phrase recognizer 22 produces the N (e.g., five) most likely possible identities, which are the N best candidates.

Based on those N best possible identities, the speaker-dependent phrase recognizer 24 retrieves the speaker-dependent whole-phrase HMM that corresponds to each of those N best possible identities from the HMM database memory 18. The speaker-dependent phrase recognizer 24 scores the cepstral plus delta cepstral features characterizing the sentence-long password utterance against each of the N speaker-dependent whole-phrase HMMs obtained from the HMN database memory 18 to generate a speaker-dependent score for each of the N best possible identities. The generated scores in the preferred embodiment are obtained as estimates of log likelihoods.

Then, for each of the N best possible identities, the score processor 26 receives (i) the speaker-independent score generated by the speaker-independent phrase recognizer 22 and (ii) the speaker-dependent score generated by the speaker-dependent phrase recognizer 24. For each of the N best possible identities, the score processor 26 sums the speaker-independent score and the speaker-dependent score to determine a combined score, which is appropriate since the generated scores are estimated log likelihoods. The score processor 26 selects the highest combined score of all the combined scores for the N best possible identities. The score processor 26 determines a putative identity, the putative identity being the particular one of the N possible identities having the highest combined score. This putative identity is subsequently verified by the verifier 28.

The verifier 28 receives for that putative identity, from the score processor 26, the speaker-independent score generated by the speaker-independent phrase recognizer 22 and the speaker-dependent score generated by the speaker-dependent phrase recognizer 24. Since the generated scores are estimated log likelihoods, the verifier 28 determines a verification score reflecting the difference between the speaker-dependent score for that putative identity and the speaker-independent score for that putative identity. The verification score is compared to a verification threshold stored in the verification database memory 30. If the verification score is above the verification threshold, then the putative identity is authenticated and allowed access to the system or service. Assigning and updating thresholds is an important aspect of ensuring quality of performance of the speaker identification system.

From the foregoing it will be appreciated that the speaker identification system determines the identity of a speaker based on a spoken password phrase and then verifies that determination using the same password phrase. The password phrase recognizer is driven by a lexicon of alternate phone transcriptions representing the password phrase selected and spoken by each user. This represents a "closed-loop" operation in contrast to an "open-loop" operation which is common for digit-string password systems. In such an "open-loop" operation there are no constraints on the digit string recognition (except perhaps the string length). "Open-loop" operation is simpler and can be used effectively because digit string recognition is highly reliable. The lexicon-driven approach for general text password phrases is necessary because phone string recognition is more difficult. The lexicon constrains the recognition and allows only registered user password phrases to be recognized.

The preferred embodiment described in the foregoing example makes use of sentence-long password phrases. System performance is believed to improve as the length of password phrases increases up to sentence-long phrases, but system operation is possible with either shorter or longer phrases.

In the foregoing example, the preferred embodiment makes use of cepstral plus delta cepstral features extracted from the speech signal. However, other types of features may be substituted or may augment the suggested features.

The preferred embodiment uses whole-phrase HMMs for the speaker-dependent model. However, the speaker-dependent model could be represented as a set of HMMs representing speech units smaller than a phrase.

Both speaker-independent scores and speaker-dependent scores are used in recognition and verification of the password phrase according to the principles of the invention. The speaker-independent score is provided by the phone-based phrase recognizer using speaker-independent phone models whereas the speaker-dependent score is output using a recognizer with speaker-dependent whole-phrase models. In the preferred embodiment the scores are estimates of log likelihoods, so that the sum of speaker-dependent and speaker-independent scores is used to propose the identity of the password phrase and the difference is used to verify the selection. For other types of scores, other score combinations are possible. For example, if the scores are estimated likelihoods, products of speaker-dependent and speaker-independent scores could be used for proposing the identity, and ratios thereof used for verification.

Other processes, which are important for good operation of a speaker identification and verification system using general text password phrases, include channel normalization techniques, such as cepstral mean subtraction (CMS), to improve operation in the face of mismatched training and test channel conditions (see for example the article by Aaron E. Rosenberg, Chin-Hui Lee, and Frank K. Soong, "Cepstral Channel Normalization Techniques for HMM-Based Speaker Verification", *Proc. 1994 International Conf. on Spoken Language Processing*, pp. 1835–1838, Yokohama, Japan, 1994"). Speaker dependent model adaptation helps compensate for the commonly occurring lack of adequate amounts of training data provided in an enrollment session to construct initial models (see for example the article by A. E. Rosenberg and F. K. Soong, "Evaluation of a Vector Quantization Talker Recognition System in Text Independent and Text Dependent Modes, *Computer Speech and Language*, vol. 2, pp. 143–157, 1987, and U.S. Pat. No. 5,377,301 entitled "TECHNIQUE FOR MODIFYING REFERENCE VECTOR QUANTIZED SPEECH FEATURE SIGNALS" issued Dec. 27, 1994 to Rosenberg et al.). Model adaptation compensates for the lack of training data by updating current models with data extracted from verified test utterances. Updating the models in this way also enriches the model parameters by accounting for a variety of test recording channels and conditions.

As the size of the group of enrolled users grows, it can be expected that the probability of confusions between entries in the lexicon will increase. Also, the computational load for the recognizer grows as the lexicon grows. With efficient algorithms and high-speed computation, the latter may not be a significant issue before the former impacts performance. It is not known at what size user group these issues become important, but suppose a practical limit is one thousand customers. A possible way to extend the operation to much larger databases is to concatenate the user-selected password phrase with a short sequence of digits.

For example, suppose a user population of size ten million is required. The user group population could be partitioned into distinct groups of one thousand. Each distinct group of the total user population could be associated with a four-digit identifier number. The group identifier digit string is appended to or combined with each user-selected password phrase. According to this specific embodiment, the account entry phrase recognition process uses digit string recognition to recognize the group identifier digit string, and password phrase recognition to select the correct password within the group.

It should be noted that users of the speaker identification system according to the invention are allowed to select password phrases and that the texts of these phrases are not known to the speaker identification system. System performance can be improved if the application allows the text to be known to the system or if the system can impose constraints on the selection. Thus, if the text is provided to the system, better phonetic transcriptions can be obtained than "free-phone," automatic transcriptions by using, for example, dictionary rules of pronunciation. Also, if the system can impose constraints on the phrase selection, the length and vocabulary could be specified to minimize confusion between phrases leading to recognizer errors. Even if the system does not have knowledge of the texts of password phrases, phonetic transcriptions can be improved by incorporating phonotactic constraints derived from language dependent phonology.

In addition to the references cited above for channel normalization and model adaptation, for training HMM's for speech applications see for example the article by B. H. Juang and L. R. Rabiner, "The Segmental K-Means Algorithm for Estimating Parameters of Hidden Markov Models," *IEEE Trans. on Acoustics, Speech and Signal Proc.*, v. 38, no. 9, pp. 1649–1641, (September 1990). For speaker independent phrase recognition see for example the article by R. C. Rose, E. Leida, G. W. Erhart, and R. V. Grubbe, "A User-Configurable System for Voice Label Recognition," *Proc.* 1996 *International Conference on Spoken Language Processing*, v. 2, pp. 582–585, 10/96.

What has been described is merely illustrative of the application of the principles of the invention. Other arrangements and methods can be implemented without departing from the spirit and scope of the invention.

What is claimed is:

1. A speaker identification system, comprising:
    a lexicon database storing for each of a group of enrolled users a set of one or more phonetic transcriptions of a password utterance associated with the enrolled user;
    an HNM database storing for each of the group of enrolled users a hidden Markov model corresponding to said password utterance;
    a speaker-independent phrase recognizer, which (i) selects N best matching password utterances based on an unknown utterance, and (ii) determines a speaker-independent score for each of the N best matching password utterances;
    a speaker-dependent phrase recognizer, which determines a speaker-dependent score for each of the N best matching password utterances; and
    a score processor, which (i) for each of the N best matching password utterances, sums the speaker-independent score and the speaker-dependent score to generate a combined score, and (ii) determines a putative identity based on the highest combined score.

2. A system as defined in claim 1, further comprising:
    a verifier which determines a verification score and compares the verification score to a verification threshold.

3. A system as defined in claim 2, wherein:
    the verification score reflects a difference between the speaker-dependent score for said putative identity and the speaker-independent score for said putative identity.

4. A system as defined in claim 1, wherein:
    the speaker-independent phrase recognizer (i) scores said unknown utterance against all the sets of phonetic transcriptions in the lexicon database, (ii) determines the N best sets of phonetic transcriptions, and (iii) selects the N best matching password utterances based on the N best sets of phonetic transcriptions.

5. A system as defined in claim 1, wherein:
    the speaker-dependent phrase recognizer (i) retrieves the hidden Markov model corresponding to each of the N best matching password utterances, and (ii) scores said unknown utterance against each of the N hidden Markov models to generate the speaker-dependent score.

6. A method for identifying a speaker, comprising the steps of:
    speaking a password utterance;
    determining a putative identity from an enrolled user group based on said password utterance by
        (i) selecting N best matching password utterances,
        (ii) determining a speaker-independent score for each of the N best matching password utterances,
        (iii) determining a speaker-dependent score for each of the N best matching password utterances,
        (iv) for each of the N best matching password utterances, summing the speaker-independent score and the speaker-dependent score to generate a combined score, and
        (v) determining the putative identity based on the highest combined score; and
    verifying the determined putative identity using said password utterance.

7. A method as defined in claim 6, further comprising the steps of:
    determining a verification score, and
    comparing the verification score to a verification threshold.

8. A method as defined in claim 7, wherein:
    the verification score reflects a difference between the speaker-dependent score for said putative identity and the speaker-independent score for said putative identity.

9. A method as defined in claim 6, wherein:
    a sequence of digits is concatenated with the password utterance.

10. A speaker identification system, comprising:
    means for selecting a putative identity from an enrolled user group based on a spoken password utterance, wherein the means for selecting includes a means for summing speaker-independent and speaker-dependent scores to obtain a combined score; and means for verifying the selected putative identity using said spoken password utterance.

11. A system as defined in claim 10, further comprising:

means for transducing a spoken password utterance into an electrical speech signal.

12. A system as defined in claim 10, further comprising:

means for extracting features characterizing the spoken password utterance.

13. A system as defined in claim 10, wherein:

a sequence of digits is concatenated with the spoken password utterance.

14. A method as defined in claim 6, further comprising the step of:

extracting features characterizing the password utterance.

* * * * *